(12) United States Patent
Luo

(10) Patent No.: US 9,803,401 B2
(45) Date of Patent: Oct. 31, 2017

(54) SECURITY TAG

(71) Applicant: Danhui Luo, Lake Worth, FL (US)

(72) Inventor: Danhui Luo, Lake Worth, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 15/581,268

(22) Filed: Apr. 28, 2017

(65) Prior Publication Data

US 2017/0226779 A1  Aug. 10, 2017

Related U.S. Application Data

(62) Division of application No. 14/548,585, filed on Nov. 20, 2014, now Pat. No. 9,637,951.

(60) Provisional application No. 62/062,402, filed on Oct. 10, 2014.

(51) Int. Cl.
  *E05B 65/00* (2006.01)
  *E05B 73/00* (2006.01)

(52) U.S. Cl.
  CPC ...... *E05B 73/0035* (2013.01); *E05B 73/0052* (2013.01); *E05B 73/0017* (2013.01); *E05B 73/0064* (2013.01); *Y10T 70/5004* (2015.04)

(58) Field of Classification Search
  CPC ............ E05B 73/0017; E05B 73/0035; E05B 73/0064; E05B 73/0052; E05B 73/00; Y10T 70/50; Y10T 70/5004; Y10T 24/44009; Y10T 24/45005; Y10T 24/45037; Y10T 24/45089; Y10T 24/50; Y10T 24/505; G02C 11/00; G02C 11/10

USPC ...... 70/14, 19, 57, 57.1, 276; 24/456, 704.1, 24/704.2; 215/201, 207, 215; 340/542, 340/571, 572.1, 572.8, 572.9
  See application file for complete search history.

(56) References Cited

U.S. PATENT DOCUMENTS

| 4,670,950 A | 6/1987 | Wisecup et al. |
| 4,774,503 A | 9/1988 | Bussard |
| 4,949,559 A * | 8/1990 | Glines ...................... B60R 7/14 |
| | | 211/64 |
| 5,019,801 A | 5/1991 | Anderson, III |

(Continued)

FOREIGN PATENT DOCUMENTS

| CN | 201138501 Y | 10/2008 |
| CN | 202299783 U | 7/2012 |

(Continued)

*Primary Examiner* — Lloyd Gall
(74) *Attorney, Agent, or Firm* — Fox Rothschild LLP; Robert J. Sacco; Carol E. Thorstad-Forsyth

(57) ABSTRACT

Systems (100) and methods (1000) for operating a Security Tag ("ST"). The methods involve rotating a Rotational Clip ("RC") of ST (132) towards a Housing Base ("HB") of ST until RC (406) contacts a latch (610) disposed within HB (404), where an article resides between a first pad (602) fixedly coupled to RC and a second pad (604) movably coupled to HB. An angled surface (626) of RC slides against an angled surface (624) of the latch so as to cause compression of a cap spring (614) and a latch spring (612). The cap spring is disposed in HB such that a center axis (818) thereof is perpendicular to a center axis (816) of the latch spring. When the latch becomes aligned with an aperture (628) formed in the rotational clip, the latch travels into the aperture as result from a pushing force applied thereto by the latch spring.

8 Claims, 8 Drawing Sheets

(56) References Cited

U.S. PATENT DOCUMENTS

| | | | |
|---|---|---|---|
| 5,068,641 | A | 11/1991 | Hogen Esch |
| 5,437,172 | A | 8/1995 | Lamy et al. |
| 5,841,349 | A | 11/1998 | Holmgren |
| 6,285,286 | B1 | 9/2001 | Tyren et al. |
| 6,374,647 | B1 | 4/2002 | Holmgren |
| 6,612,139 | B1 | 9/2003 | Costa |
| 7,808,386 | B1 | 10/2010 | Sayegh et al. |
| 8,294,583 | B2 | 10/2012 | Sayegh et al. |
| 8,390,460 | B2 | 3/2013 | Zinner |
| 8,416,082 | B2 | 4/2013 | Sayegh et al. |
| 8,890,694 | B2 | 11/2014 | Yang |
| 9,404,289 | B2 | 8/2016 | Sayegh et al. |
| 9,637,951 | B2 * | 5/2017 | Luo .................... E05B 73/0017 |
| 2006/0070410 | A1 | 4/2006 | Fuss et al. |
| 2007/0295039 | A1 | 12/2007 | Belden |
| 2008/0030334 | A1 | 2/2008 | Marsilio et al. |
| 2008/0061987 | A1 | 3/2008 | Kolton et al. |
| 2008/0284601 | A1 | 11/2008 | Sayegh et al. |
| 2010/0060460 | A1 | 3/2010 | Zinner |
| 2010/0126238 | A1 | 5/2010 | Mazzucchelli |
| 2010/0176951 | A1 | 7/2010 | Zinner |
| 2012/0000254 | A1 | 1/2012 | Zhao |
| 2012/0174635 | A1 | 7/2012 | Pierobon |
| 2012/0234056 | A1 | 9/2012 | Thoonsen |
| 2016/0258192 | A1 | 9/2016 | Bouan |

FOREIGN PATENT DOCUMENTS

| | | | |
|---|---|---|---|
| WO | 9623123 | A1 | 8/1996 |
| WO | 2014029949 | A1 | 2/2014 |

* cited by examiner

SECURITY TAG

CROSS-REFERENCE TO RELATED APPLICATIONS

This application is a divisional application of and claims priority to U.S. patent application Ser. No. 14/548,585 (now U.S. Pat. No. 9,637,951) which was filed Nov. 20, 2014 and U.S. Patent Application No. 62/062,402 which was filed Oct. 10, 2014. The contents of the above applications are incorporated by reference in their entirety.

FIELD OF THE INVENTION

This document relates generally to security tags used in Electronic Article Surveillance ("EAS") systems. More particularly, this document relates to security tags and methods for preventing the unauthorized removal of articles (e.g., optical wear) from a given location (e.g., a retail store).

BACKGROUND OF THE INVENTION

In retail stores for optical articles, it is desirable to present a large variety of eyeglasses and eyeglass frames to prospective buyers in a manner which allows them easily to examine and compare a large number of different frames or eyeglasses. Eyeglasses and eyeglass frames are constructed with temple pieces or earpieces to engage a wearer's ears to hold the eyeglasses in place. The eyeglass temples are usually pivotally coupled to a lens support. The lens support may include spaced pads or an arch portion which fits the bridge of the nose. This construction is common to eyeglass frames, finished eyeglasses, sunglasses, reading glasses, goggles, protective eyewear and the like.

Eyeglasses and eyeglass frames may be expensive. Their value and relatively small size make these articles target for thieves. In order to prevent theft, optical retailers often display eyeglasses or frames in locked glass cases. This approach not only greatly increases the overhead, but also requires the presence of salespeople to allow a customer to try on a pair of eyeglasses. In addition, display cases present a barrier between the customer and the product.

Other attempts to overcome security problems include connecting eyeglass frames to a weight or fixture using cables or chains. Such devices allow customers to handle the eyeglasses and try them on without the assistance of personnel. The cable or chain connecting the model eyewear to the weight or fixture may be effective for preventing a thief from pocketing the eyewear, but there are shortcomings in this type of system as well. The cables or chains connected to the model eyewear can break or become tangled from customer handling. Tangled cables and chains prevent customers from fully accessing the model eyewear and make the display space look unattractive. Cables or chains attached to eyewear also interfere with the customer's ability to try on the eyewear comfortably. Sometimes cables or chains are removed by personnel to allow a customer to try on a product, which reduces the effectiveness of the security system.

SUMMARY OF THE INVENTION

The disclosure concerns implementing systems and methods for operating a security tag. The methods involve rotating a rotational clip of the security tag towards a housing base of the security tag until the rotational clip contacts a latch disposed within the housing base. At least a portion of an article (e.g., a side frame of optical wear) resides between the rotational clip and the housing base. An angled surface of the rotational clip is slid against an angled surface of the latch so as to cause a simultaneous compression of a cap spring and a latch spring. The cap spring is disposed in the housing base such that a center axis thereof is perpendicular to a center axis of the latch spring. An engagement structure of the latch is then aligned with an aperture formed in the rotational clip. At this time, a pushing force applied by the latch spring to the latch causes the engagement structure to travel into the aperture formed in the rotational clip.

Once the engagement structure travels into the aperture of rotational clip, the security tag is securely attached to the article. In this regard, it should be understood that a clamping force is applied to the portion of the article by the rotational clip and the housing base. Notably, a first pad is fixedly coupled to the rotational clip, and a second pad is movably coupled to the housing base. The second pad is resiliently biased by the cap spring in a direction away from the housing base and towards the first pad, whereby the clamping force is of a level to securely couple the security tag to the article regardless of the overall thickness of the article's portion residing between the first and second pads. A frictional force is also applied to the portion of the article by the first and second pads if the article is pulled. A sensor may be disposed within the security tag to detect when the article to which the security tag is affixed enters a surveillance zone of an EAS system.

The latch may disengage the rotational clip when a magnetic field is applied thereto. Thereafter, the rotational clip may be rotated in a direction away from the housing base. As a result of such rotation, the security tag may be removed from the article.

DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
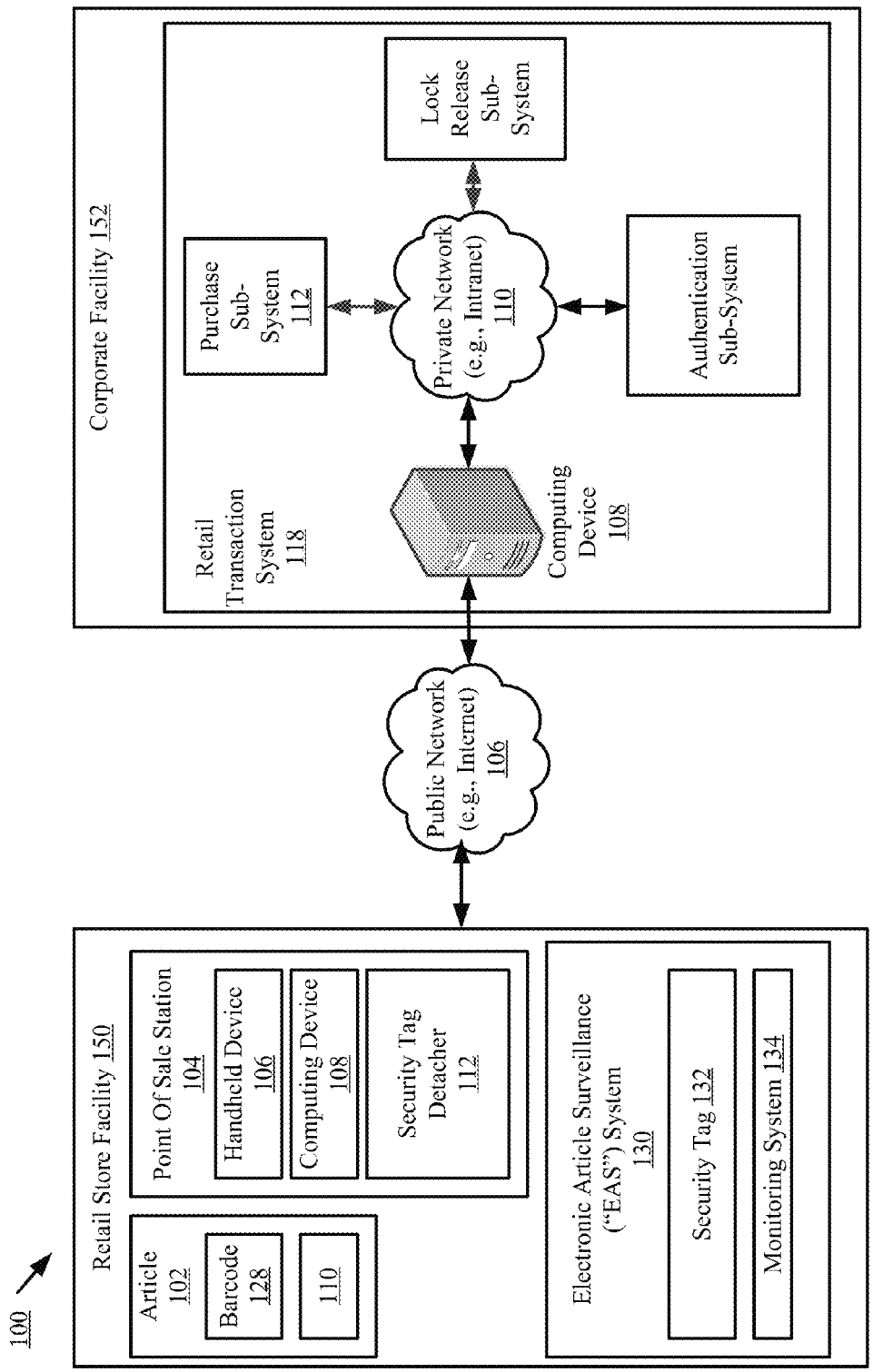
FIG. 1 is a schematic illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

There exists a need for an improved EAS security system for optical wear and other articles (1) that allow customers to handle and try on the same without interference from the security tag and/or (2) that can be easily attached and detached therefrom by one or more authorized persons (e.g., store personnel). Accordingly, the present disclosure concerns improved security tags for eyeglass frames, finished eyeglasses, sunglasses, reading glasses, goggles, protective eyewear and other types of articles having similar needs or attributes. In the optical wear scenarios, the security tags are generally configured to be attached to a side frame or temple of optical wear such that the security tags do not interfere with the wearers' vision. Parallel soft pads are provided along with a securement mechanism of each security tag so as to minimize any damage to the side frame or temple of the optical wear to which a compression force is being applied by the securement mechanism. The securement mechanism is designed to apply a compression force which is effective for any frame or temple thickness.

Notably, the security tags implement a one-click application method for enabling their attachment to the articles. The one-click application method eliminates the human factor which during attachment may make the security tag easy to defeat due to insufficient compression force or otherwise make the security tags inoperable due to excessive compression force. The security tags also have a one-piece design, thus ensuring easy handling and less inventory management thereof. Known magnetic detachers can be used to detach the security tags from the articles.

Figure 2:
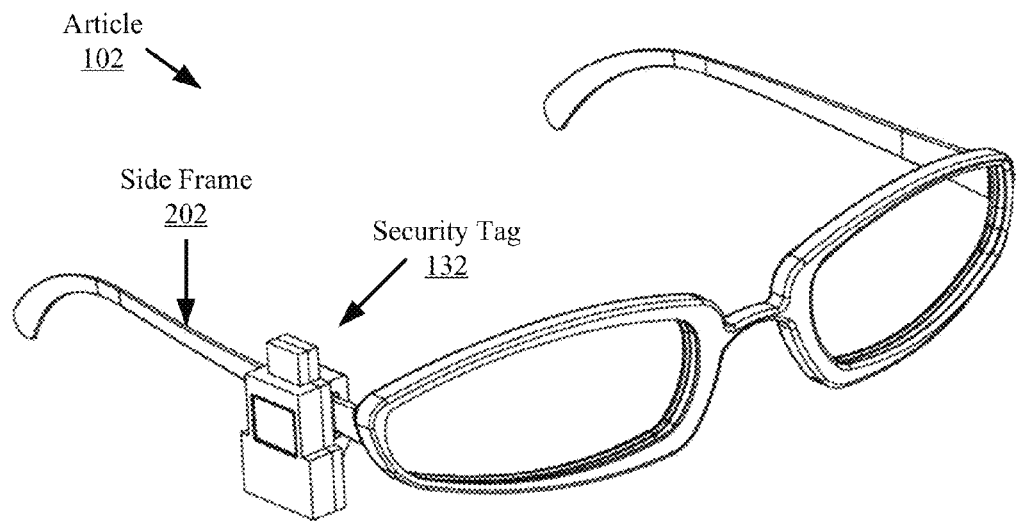
FIG. 2 is a front perspective view of a piece of optical wear with a security tag attached thereto.

Referring now to FIG. 1, there is provided a schematic illustration of an exemplary system 100 that is useful for understanding the present invention. System 100 comprises a retail store facility 150 including an EAS 130. The EAS 130 comprises a monitoring system 134 and at least one security tag 132. Although not shown in FIG. 1, the security tag 132 is attached to article 102, thereby protecting the article 102 from an unauthorized removal from the retail store facility 150. A schematic illustration of the security tag 132 attached to an article 102 is provided in FIG. 2. As shown in FIG. 2, the article can include, but is not limited to, optical wear. The monitoring system 134 establishes a surveillance zone (not shown) within which the presence of the security tag 132 can be detected. The surveillance zone is established at an access point (not shown) for the retail store facility 150. If the security tag 132 is carried into the surveillance zone, then an alarm is triggered to indicate a possible unauthorized removal of article 102 from the retail store facility 150.

During store hours, a customer (not shown) may desire to purchase the article 102. The customer can purchase the article 102 using a Point Of Sale ("POS") station 104. The POS station 104 can include, but is not limited to, a traditional fixed Point Of Sale ("POS") station (e.g., a checkout counter) or a mobile POS station. In either scenario, a retail transaction application executing on a computing device 108 of the POS station 104 facilitates the exchange of data between the article 102, security tag 132, customer, store associate (not shown) and/or Retail Transaction System ("RTS") 118 of a corporate facility 152. For example, after the retail transaction application is launched, a store associate is prompted to start a retail transaction process for purchasing the article 102. The retail transaction process can be started simply by performing a user software interaction, such as depressing a key on a keypad of the computing device 108 or touching a button on a touch screen display of the computing device 108.

Subsequently, the store associate may manually input into the retail transaction application article information. Alternatively or additionally, the store associate may place a handheld device 106 of the POS station 104 in proximity of article 102. As a result of this placement, the POS station 104 obtains article information from the article 102. The article information includes any information that is useful for purchasing the article 102, such as an article identifier and an article purchase price. In some scenarios, the article information may even include an identifier of the security tag 132 attached thereto. The article information can be communicated from the article 102 to the handheld device of the POS station 104 via a short range communication, such as a barcode communication or a Near Field Communication ("NFC").

In the barcode scenario, article 102 has a barcode 128 attached to an exposed surface thereof. The term "barcode", as used herein, refers to a pattern or symbol that contains embedded data. Barcodes may include, for example, one-dimensional barcodes, two dimensional barcodes (such as matrix codes, Quick Response ("QR") codes, Aztec codes and the like), or three-dimensional bar codes. The embedded data can include, but is not limited to, a unique identifier of the article 102 and/or a purchase price of article 102. The barcode 128 is read by a barcode scanner/reader (not shown in FIG. 1) of the POS station 104. Barcode scanners/readers are well known in the art. Any known or to be known barcode scanner/reader can be used herein without limitation.

In the NFC scenarios, article 102 may comprise an NFC enabled device 110. The NFC enabled device 110 can be separate from security tag 132 or comprise security tag 132. An NFC communication occurs between the NFC enabled device 110 and the handheld device 106 over a relatively small distance (e.g., N centimeters or N inches, where N is an integer such as twelve). The NFC communication may be established by touching components 102, 106 together or bringing them in close proximity such that an inductive coupling occurs between inductive circuits thereof. In some scenarios, the NFC operates at 13.56 MHz and at rates ranging from 106 kbit/s to 848 kbit/s. The NFC may be achieved using NFC transceivers configured to enable contactless communication at 13.56 MHz. NFC transceivers are well known in the art, and therefore will not be described in detail herein. Any known or to be known NFC transceivers can be used herein without limitation.

After the POS station 104 obtains the article information, payment information is input into the retail transaction application of POS station 104. In response to the reception of the payment information, the POS station 104 automatically performs operations for establishing a retail transaction session with the RTS 118. The retail transaction session can involve: communicating the article information and payment information from the POS station 104 to the RTS 118 via a public network 106 (e.g., the Internet); completing a purchase transaction by the RTS 118; and communicating a response message from the RTS 118 to the POS station 104 indicating that the article 102 has been successfully or unsuccessfully purchased. The purchase transaction can involve using an authorized payment system, such as a bank Automatic Clearing House ("ACH") payment system, a credit/debit card authorization system, or a third party system (e.g., PayPal®, SolidTrust Pay® or Google Wallet®).

The purchase transaction can be completed by the RTS 118 using the article information and payment information. In this regard, such information may be received by a computing device 108 of the RTS 118 and forwarded thereby to a sub-system of a private network 100 (e.g., an Intranet). For example, the article information and purchase information can also be forwarded to and processed by a purchase sub-system 112 to complete a purchase transaction. When the purchase transaction is completed, a message is generated and sent to the POS station 104 indicating whether the article 102 has been successfully or unsuccessfully purchased.

If the article 102 has been successfully purchased, then a security tag detaching process can be started. During the security tag detaching process, a security tag detacher 112 of the POS station 104 is used to cause actuation of a detaching mechanism of the security tag 132. Once the security tag 132 has been detached from article 102, the customer can carry the article 102 through the surveillance zone without setting off the alarm.

Figure 3:
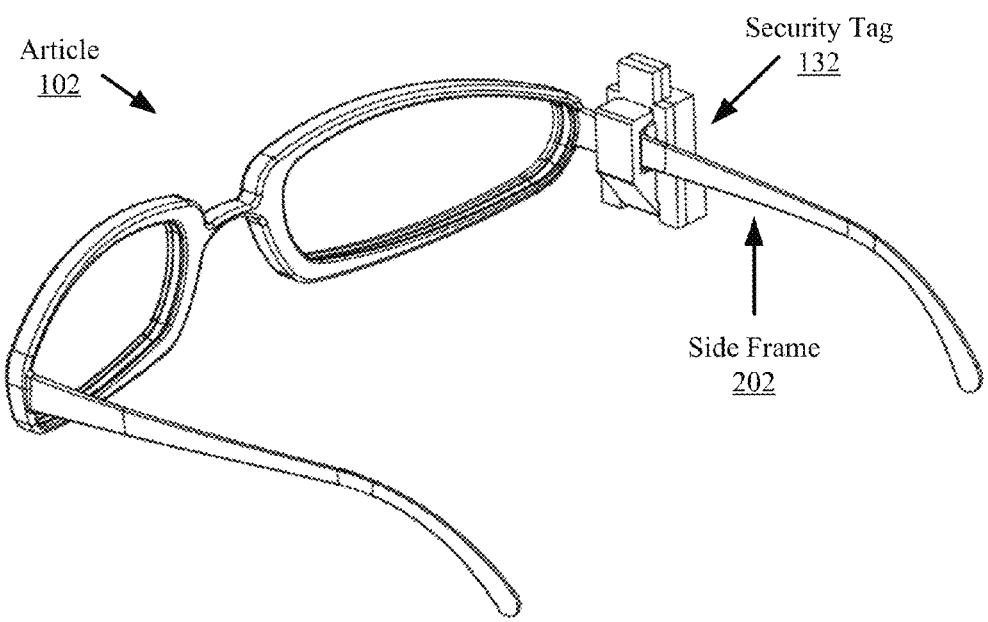
FIG. 3 is a rear perspective view of a piece of optical wear with a security tag attached thereto.
Figure 4:
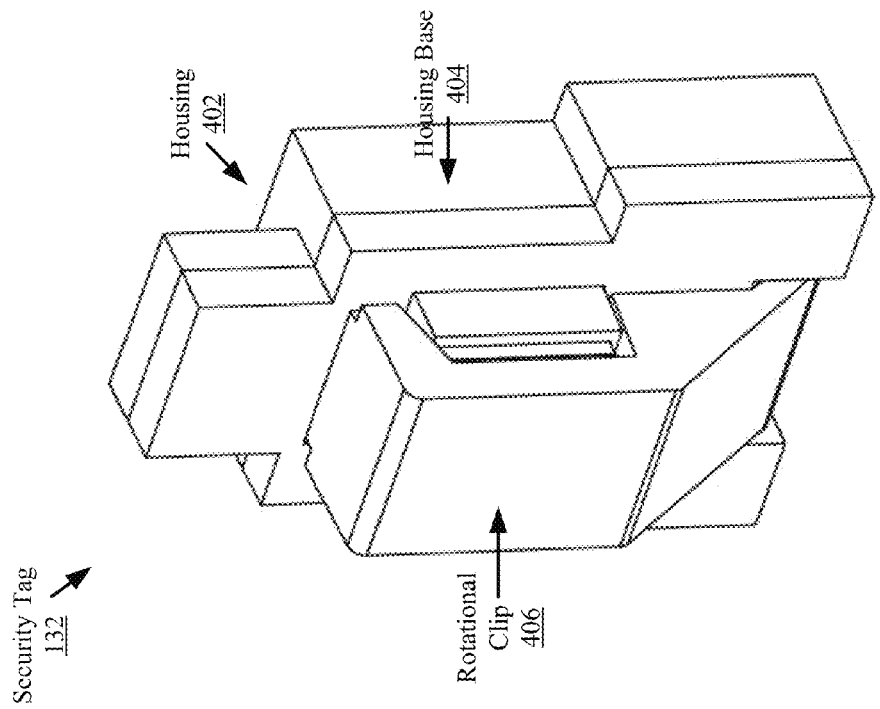
FIG. 4 is a front perspective view of the security tag shown in FIGS. 2-3.
Figure 5:
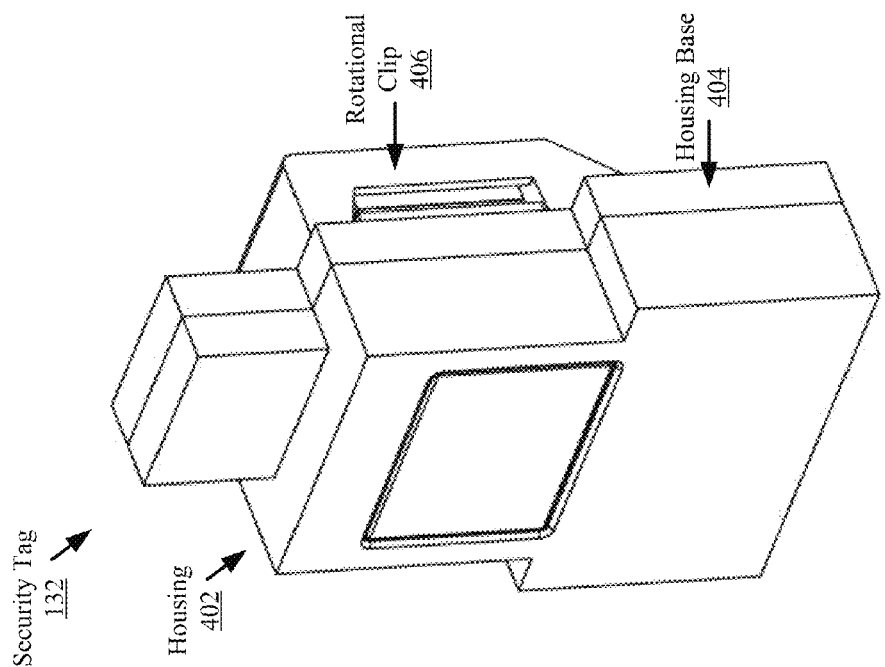
FIG. 5 is a rear perspective view of the security tag shown in FIGS. 2-4.

Referring now to FIGS. 2-3, there are provided schematic illustrations of the security tag 132 attached to an article 102. As noted above, the article 102 can include, but is not limited to, optical wear. As such, the security tag 132 will be described below in relation to glasses. However, the present invention is not limited in this regard. The security tag 132 can be used with other types of articles that have a linear member which can be clamped between two opposing clamp surfaces of the security tag. In all scenarios, the security tag 132 is generally designed to be removably coupled to the article, without causing damage thereto (e.g., by not exerting excessive pressure or compression force thereon).

More detailed schematic illustrations of the security tag 132 are provided in FIGS. 4-7. As shown in FIGS. 4-7, the security tag 132 comprises a housing 402. The housing 402 can be formed from any suitably material, such as plastic (e.g., which may have been injection molded). The material from which the housing 402 is formed may be transparent or opaque. However, there are certain advantages to using transparent materials for the housing 402. For example, transparent materials facilitate the minimization of any obstruction of the article's appearance by the security tag 132.

The housing 402 has a housing base 404 and a rotational clip 406. The housing base 404 is formed of a back cover 606 and a front cover 608, which may be ultrasonically welded together during assembly of the security tag 132. Covers 606 and 608 collectively define insert spaces 632, 640, 646, 652 in which various components of the security tag 132 are housed.

Figure 6:
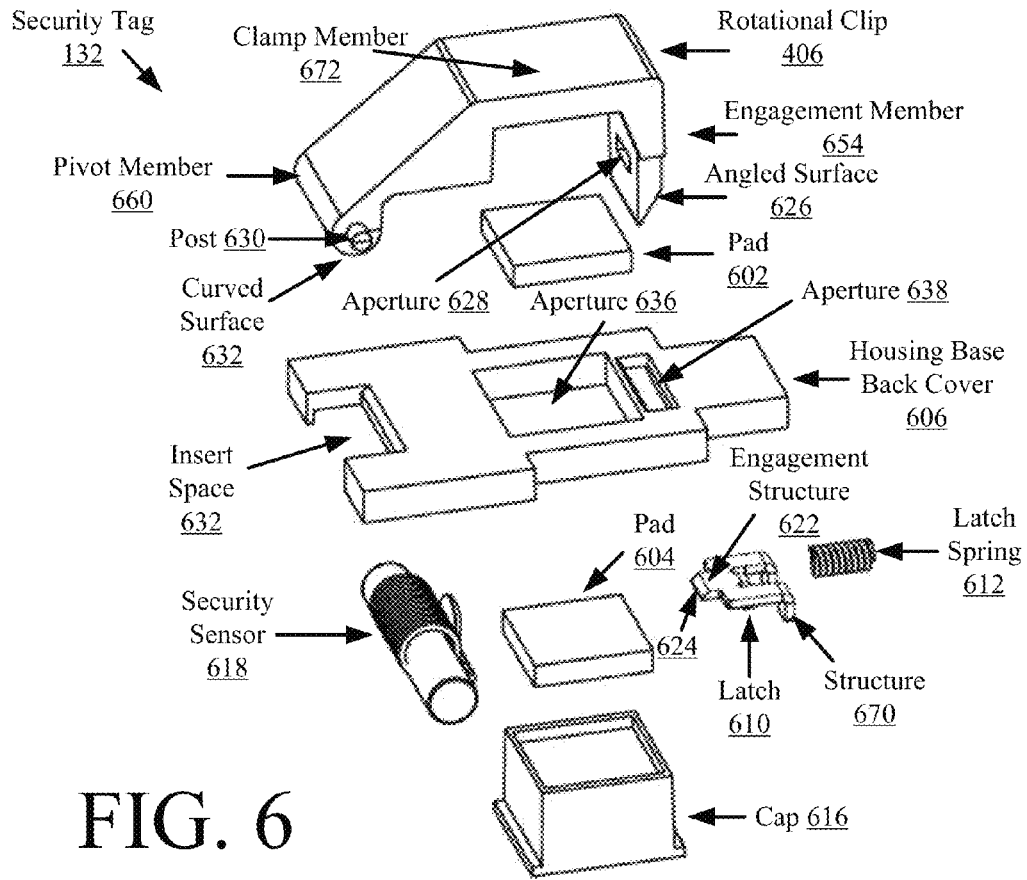
FIG. 6 is an exploded view of the security tag shown in FIGS. 2-5.
Figure 6:
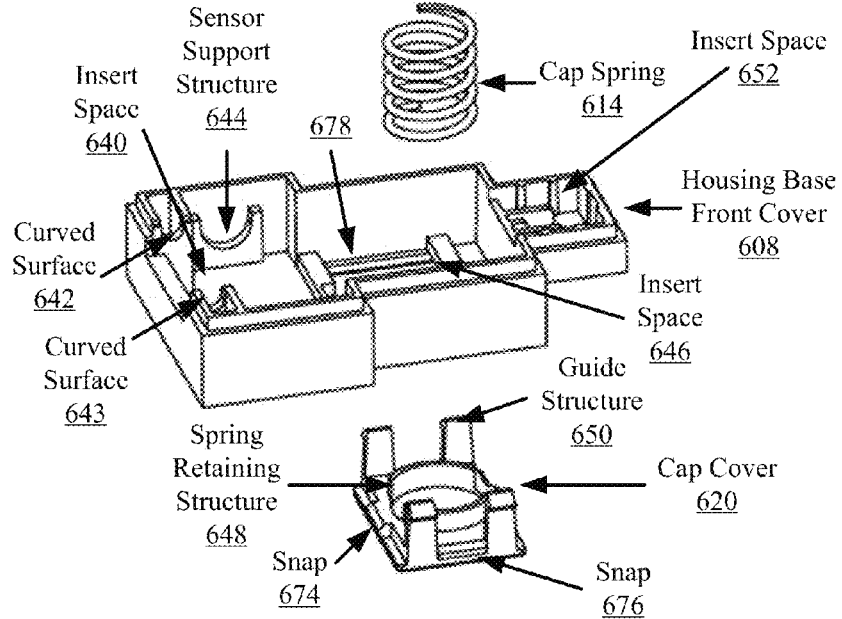
Figure 7:
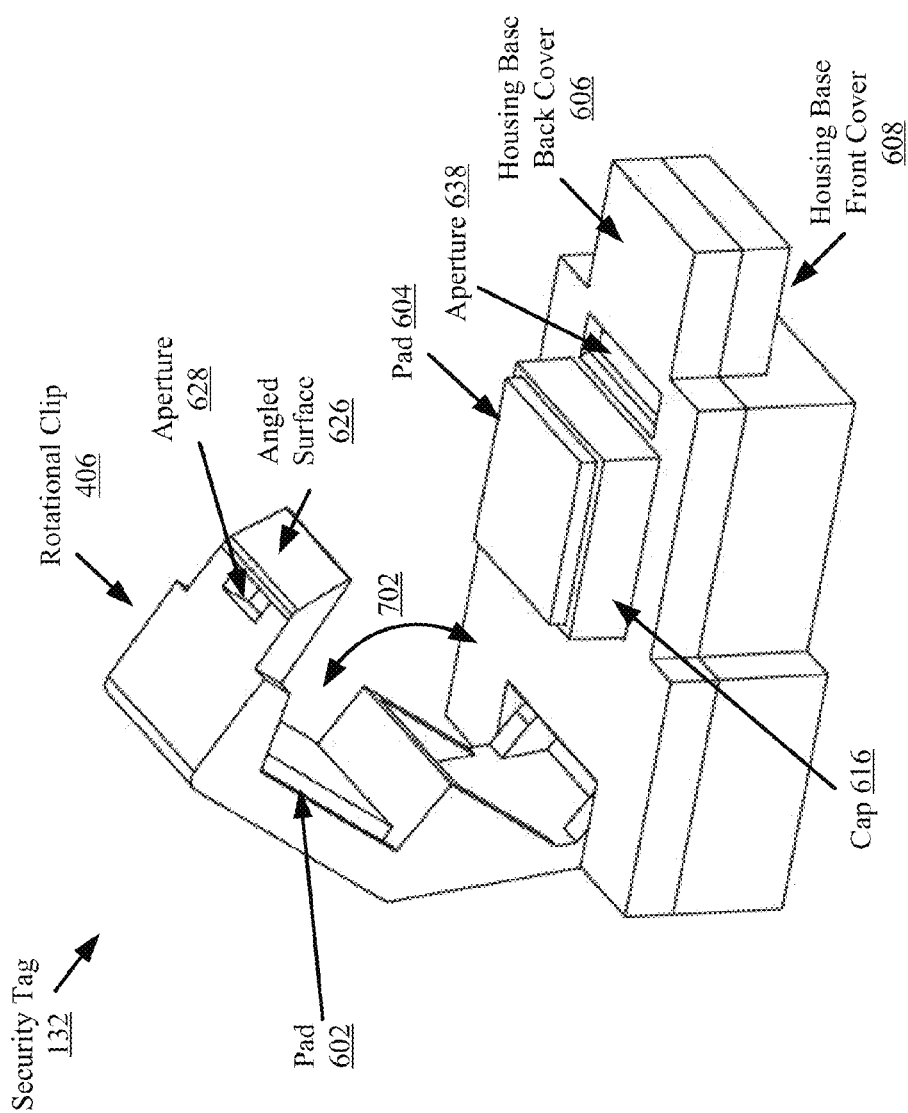
FIGS. 7-9 provide schematic illustrations that are useful for understanding operations of the security tag shown in FIGS. 2-6.
Figure 8:
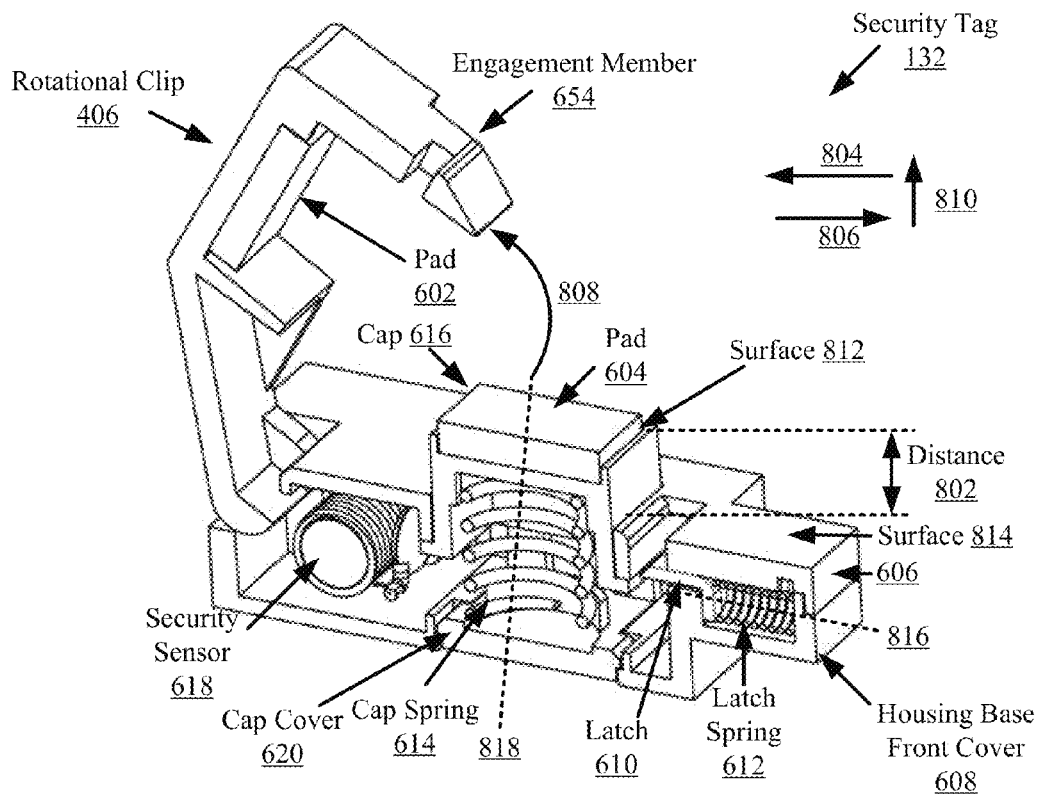
Figure 9:
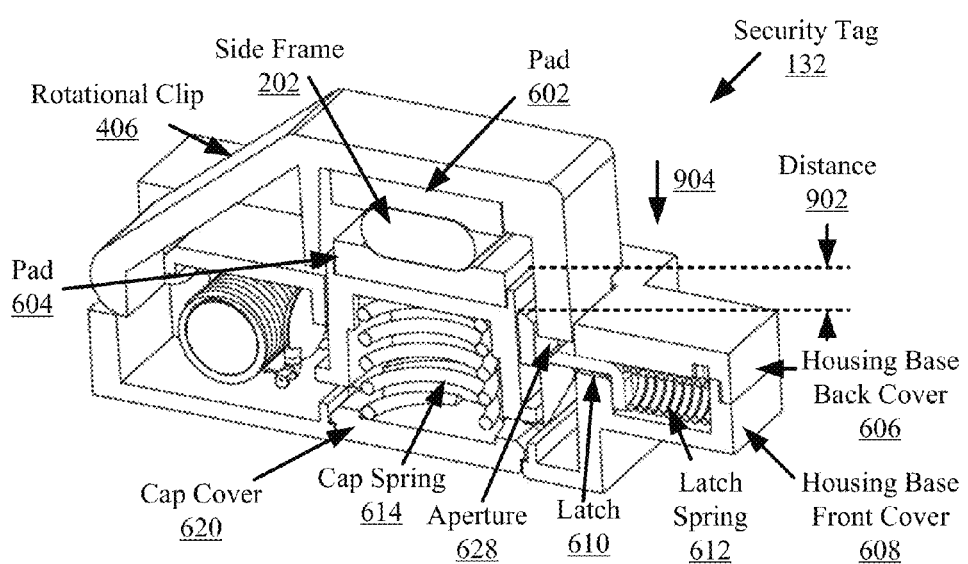

In some scenarios, one or more security sensors 618 is(are) disposed within the housing base 404 (as shown in FIGS. 6, 8 and 9) and/or rotational clip 406. Security sensors are well known in the art, and therefore will not be described herein. Any known or to be known security sensors can be used herein without limitation. Still, it should be understood that the security sensor provides a way to detect when an article is being removed from a particular area by an unauthorized person or in an unauthorized manner (e.g., without being purchased). As such, the security label includes a sensor operable with EAS technology. Such sensors can include, but are not limited to, an NFC sensor and/or an RFID sensor. The security sensor may be configured to provide an audible, visual and/or tactile alarm when it passes into the surveillance zone of an EAS system. Also, the security label may comprise a passive device, an active device and/or a hybrid passive/active device. A support structure (e.g., structure 644) may be provided to retain and/or maintain the security sensor in a particular position within the housing base 404 and/or rotational clip 406.

The rotational clip 406 is pivotally mounted on the housing base 404. As such, the rotational clip 406 can be rotated towards and away from the back cover 606 of the housing 402, as shown by bi-directional arrow 702 of FIG. 7. For example, the rotational clip 406 may be rotated away from the back cover 606 when an article is to be disposed within the security tag 132 and/or when the security tag is to be decoupled from the article. In contrast, the rotational clip 406 may be rotated towards the back cover 606 such that the rotational clip 406 can be locked in its closed position, whereby the article is securely coupled to the security tag 132.

As shown in FIG. 6, the pivotal movement of the rotational clip 406 is facilitated by a pivot member 660. Pivot member 660 comprises at least one post 630 and a curved surface 632. When assembled, the pivot member 660 resides within insert space 632, while the post(s) 630 reside(s)

between the front and back covers 606, 608 within an insert space 640. Each post is generally circular in shape such that it can be supported by a curved surface 642 or 643 of a sidewall defining insert space 640, as well as be rotated thereon.

The locking of the rotational clip 406 in its closed position is facilitated by an engagement member 654 thereof. The engagement member 654 comprises an aperture 628 and an angled surface 626. When the rotational clip 406 is moved towards the back cover 606, the engagement member 654 travels through an aperture 638 formed in the back cover 606. Thereafter, the angled surface 626 of the engagement member 654 engages an angled surface 624 of a latch 610. The angled surface 626 slides along angled surface 624 as the rotational clip 406 is further moved in a direction towards the back cover 606. This sliding movement causes the latch 610 to compress a latch spring 612. When an engagement structure 622 of the latch 610 becomes aligned with the aperture 628 formed through the engagement member 654 of the rotational clip 406, the latch spring 612 returns to its less compressed state whereby the engagement structure 622 of the latch 610 travels into the aperture 628 so as to lock the rotational clip 406 in its closed position. Notably, the latch 610 and latch spring 612 are disposed in an insert space 652 of the front cover 608. Also, an audible and/or tactile indictor may be generated and output when the rotational clip 406 is locked in its closed position so that the user knows when the article has been securely coupled to the security tag 132.

The rotational clip 406 can be unlocked by the application of a magnetic field to the latch 610 and the latch spring 612. In this regard, the latch and latch spring are formed of a magnetic material, such as metal. As shown in FIG. 6, the latch 610 has two protruding structures 670 with surface areas having a size selected for maximizing a magnetic force when a magnetic field is applied thereto. The magnetic field causes the latch spring 612 to transition from its less compressed state to its further compressed state, whereby the latch 610 is removed from the aperture 628 of the rotational clip 406. Compressing the rotational clip 406 by the operator to relieve the force from cap spring 614 may be required to allow latch 610 to travel under the magnetic force. At this time, the rotational clip 406 can be rotated away from the housing base's back cover 606.

The article 102 is retained between the housing base 404 and the rotational clip 406 via a frictional force and a compression force that is applied thereto. The frictional force is applied to the article 102 via two pads 602 and 604 if the article is pulled. In this regard, the pads are both formed of a frictional material, such as rubber. During use, the article 102 cannot be removed from the locked security tag 132 by an unauthorized person since (s)he is unable to apply a load to the article 102 that is sufficient to overcome at least the frictional force applied by the pads 602, 604. Notably, the pads 602 and 604 have a dual purpose of (1) providing said frictional force when the security tag is being used and (2) ensuring that the article is not damaged by the security tag when clamped therein.

The compression force is applied to the article 102 by the rotational clip 406 and a cap 616 when the security tag 132 is in its locked position. In this regard, it should be understood that the cap 616 is a spring-loaded cap that can move in two opposing directions represented by arrows 810 of FIG. 8 and 904 of FIG. 9. The spring-loaded cap is assembled by: securing the cap 616 in an insert space 646 formed between the front and back covers 608, 606; disposing a cap spring 614 within insert space 646 after the front and back covers have been attached to each other (e.g., by an ultrasonic weld); and securely coupling a cap cover 620 to the front cover 608. The cap spring 614 comprises at least one stop structure thereon which prevents the cap from being dislodged from the housing base by the cap spring 614. The housing base may additionally or alternatively include a stop structure for the same purpose. The cap spring 614 has a force selected in accordance with a particular application. The greater the force, the greater the security level. Notably, the cap spring 614 is normally biased towards the cap 616. As such, the pad 604 is spring-biased towards the pad 602 during use of the security tag 132. When the security tag 132 is in use, the pads 602 and 604 are aligned with each other so that the article 102 resides therebetween.

The cap cover 620 acts as a fixed, unmovable structure for (1) retaining the cap spring 614 within insert space 646 and (2) maintaining the cap spring 614 in alignment with the cap 616. The first function (1) is facilitated by guide structures 650 and snap structures 674, 676. The guide structures 650 enable (1) proper alignment of the cap cover 620 when being assembled with the front cover 608 and (2) facilitate secure, unmovable coupling of the cap cover 620 with the front cover 608. The snap structures 674, 676 provide secure coupling mechanisms which snap into place when the cap cover 620 is pressed towards the front cover 608. In this regard, each snap structure 674, 676 snappingly engages an engagement structure 678 formed on an inner surface of the front cover 608.

Figure 11:
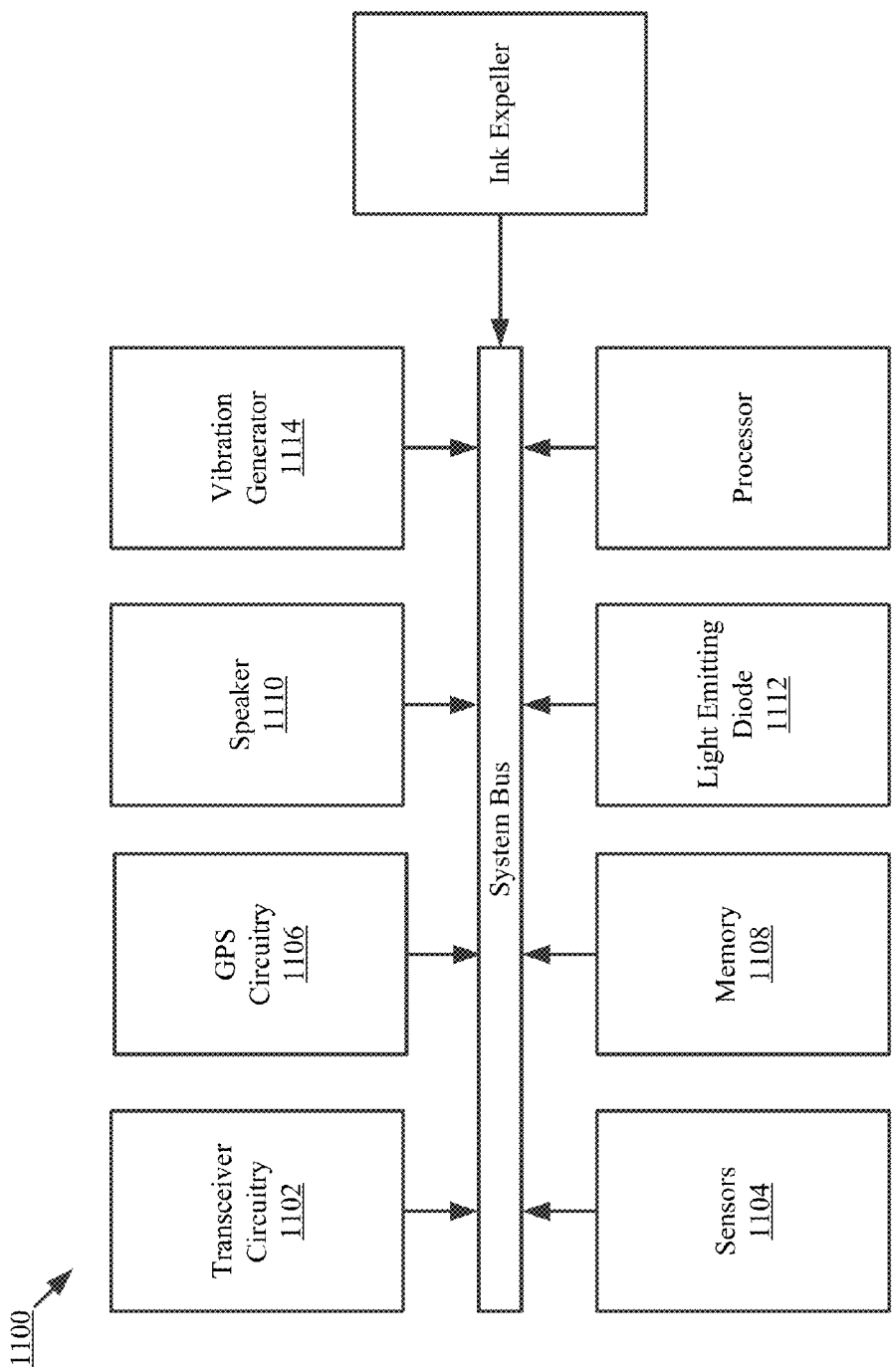
FIG. 11 is a block diagram of exemplary circuitry of a security tag which is useful for understanding the present invention.

In some scenarios, the security tag 132 is designed to expel ink when a sensor (e.g., sensor 1104 of FIG. 11) thereof detects an attempt to break the rotational clip 406, detects that the rotational clip 406 has been broken or bent, detects that an attempt has been made to disengage/decouple the rotational clip 406 from the housing base 404, and/or detects an attempt to pull the frame 202 out of the security tag 132. Various audio (e.g., an alarm), visual (e.g., light) and/or tactile indicators (e.g., vibration) can also be output from the security tag 132 when an unauthorized attempt is made to remove the security tag from the article, or from a particular geographic location. Sensor information, audio/visual/tactile indicator information, and/or geographic location information may be communicated from the security tag to a remote communication device (e.g., a mobile or stationary point of sale device 106, 108 of FIG. 1, or a mobile device of a store employee) so as to (1) immediately inform a store associate that an unauthorized attempt to remove the security tag from an article is occurring or has just occurred at a certain location in the facility and/or (2) continuously or periodically inform the store associate as to the location of the security tag. As such, the security tag can include internal circuitry (e.g., circuitry 1100 of FIG. 11) such as GPS circuitry (e.g., GPS circuitry 1106 of FIG. 11), transceiver circuitry (e.g., transceiver circuitry 1102 of FIG. 11), and memory (e.g., memory 1108 of FIG. 11). Communication of this information may be triggered upon the detection of an attempt to cut or break the rotational clip 406, an attempt to cut or break the frame 202, and/or an attempt has been made to disengage/decouple the rotational clip 406 and/or frame 202 from the security tag 132.

Referring now to FIG. 8, there is provided a cross-sectional view of the assembled security tag 132 in its unlocked (or open) position. As shown in FIG. 8, the rotational clip 406 is rotated away from the housing base 404, as shown by arrow 808. In effect, the latch 610 does not engage the engagement member 654 of the rotational clip 406. Also, the cap 616 and pad 604 are spring-biased in a direction 810 away from the housing base's back cover 606.

In this regard, it should be understood that the cap spring 614 is normally in its less compressed state, whereby a distance 802 exists between a surface 812 of the cap 616 and a surface 814 of the housing base's back cover 606. The latch spring 612 is also normally in its less compressed state. As such, the latch 610 is spring-biased towards the cap 616.

Referring now to FIG. 9, there is provided a cross-sectional view of the assembled security tag 132 in its locked (or closed) position. As shown in FIG. 9, the rotational clip 406 is rotated towards the housing base 404 such that the latch 610 engages the engagement member 654 of the rotational clip 406. A side frame 202 of an article 102 is clamped between pads 602 and 604. In this regard, it should be understood that the cap 616 and pad 604 are still spring-biased in a direction 810 away from the housing base's back cover 606. However, the cap spring 614 is in a further compressed state. In effect, the distance between the surface 812 of the cap 616 and the surface 814 of the housing base's back cover 606 has been reduced, as shown by reference numbers 802 and 902.

Figure 10:
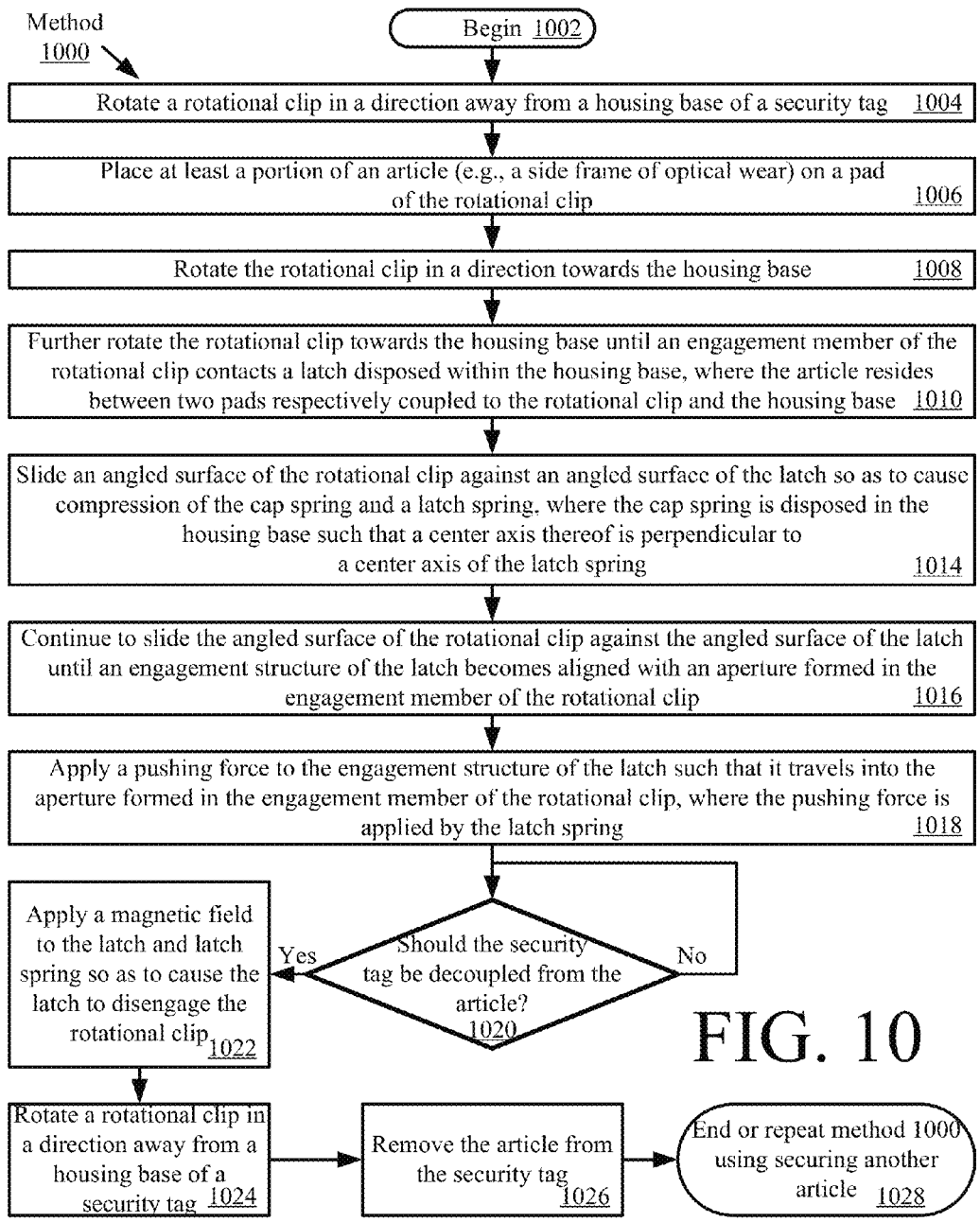
FIG. 10 is a flow diagram of an exemplary method for protecting an article using a security tag.

Referring now to FIG. 10, there is provided an exemplary method 1000 for operating a security tag (e.g., security tag 132 of FIG. 1) of an EAS system (e.g., EAS system 100 of FIG. 1). Method 1000 begins with step 1002 and continues with step 1004. In step 1004, a rotational clip (e.g., rotational clip 406 of FIG. 4) is rotated in a direction (e.g., direction 808 of FIG. 8) away from a housing base (e.g., housing base 404 of FIG. 4) of the security tag. Once the rotational clip has been rotated a certain distance from the housing base, step 1006 is performed where at least a portion (e.g., side frame 202 of FIG. 2) of an article (e.g., article 102 of FIG. 1) is placed on a pad (e.g., pad 602 of FIG. 6) of the rotational clip. Notably, another pad is coupled to the housing base and resiliently biased in a direction (e.g., direction 810 of FIG. 1) away from the housing base by a cap spring (e.g., cap spring 614 of FIG. 6). The rotational clip is then rotated towards the housing base, as shown by step 1008.

In next step 1010, the rotational clip is further rotated. More specifically, the rotational clip is further rotated in step 1010 until an engagement member (e.g., engagement member 654 of FIG. 6) of the rotational clip contacts a latch disposed within the housing base, where the article resides between two pads (e.g., pads 602 and 604 of FIG. 6) respectively coupled to the rotational clip and the housing base. As the rotational clip continues to be rotated, an angled surface (e.g., angled surface 626 of FIG. 6) of the rotational clip slides against an angled surface (e.g., angled surface 624 of FIG. 6) so as to cause compression of the cap spring and a latch spring (e.g., latch spring 612 of FIG. 6), as shown by step 1014. Notably, the cap spring is disposed in the housing base such that a center axis (e.g., center axis 818 of FIG. 8) is aligned perpendicular to a center axis (e.g., center axis 816 of FIG. 8) of the latch spring. The angled surface of the rotational clip continues to slide against the angled surface of the latch until an engagement structure (e.g., engagement structure 622 of FIG. 6) of the latch becomes aligned with an aperture (e.g., aperture 628 of FIG. 6) formed in the engagement member of the rotational clip, as shown by step 1016.

A pushing force is then applied to the engagement structure of the latch in step 1018 by the latch spring. In effect, the latch's engagement structure travels into the aperture formed in the engagement member of the rotational clip. Consequently, the security tag is securely coupled to the article.

At some later time, a decision step 1020 is performed to determine if the security tag should be decoupled from the article. If it is determined that the security tag should not be decoupled from the article [1020:NO], then method 1000 waits for a period of time before performing a second iteration of decision step 1020.

In contrast, if it is determined that the security tag should be decoupled from the article [1020:YES], then steps 1022-1026 are performed. Step 1022 involves applying a magnetic field to the latch and latch spring so as to cause the latch to disengage the rotational clip. Compressing the rotational clip by the operator to relive the force from the cap spring may be required to allow the latch to travel under the magnetic force. Step 1024 involves rotating the rotational clip in a direction away from the housing base of the security tag. Step 1026 involves removing the article from the security tag. Thereafter, step 1028 is performed where method 1000 ends or is repeated using another article.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

I claim:

1. A method for operating a security tag, comprising:
rotating a rotational clip of the security tag towards a housing base of the security tag until the rotational clip contacts a latch disposed within the housing base, where at least a portion of an article resides between the rotational clip and the housing base, and the latch is resiliently biased in a first direction by a latch spring;
sliding an angled surface of the rotational clip against an angled surface of the latch so as to cause simultaneous compression of a cap spring and the latch spring, where the cap spring is disposed in the housing base such that a center axis thereof is perpendicular to a center axis of the latch spring;
aligning an engagement structure of the latch with an aperture formed in the rotational clip;
applying a pushing force by the latch spring to the latch such that the engagement structure travels into the aperture formed in the rotational clip; and
applying a compressive force directly to the portion of the article by the rotational clip and a cap when the security tag is in use;
wherein the cap is movably coupled to housing base so as to be resiliently biased at all times in a second direction away from the housing base by the cap spring, and the cap at least partially protrudes out and away from the housing base when in an unengaged position.

2. The method according to claim 1, wherein the cap spring and latch spring are each in an uncompressed state when the rotational clip is not engaging the latch.

3. The method according to claim 1, further comprising applying a frictional force to the portion of the article by a first pad fixedly coupled to the rotational clip and a second pad movably coupled to the housing base.

4. The method according to claim 1, further comprising causing the latch to disengage the rotational clip by applying a magnetic field to the latch.

5. The method according to claim 4, further comprising rotating the rotational clip in a direction away from the housing base.

6. The method according to claim 5, further comprising removing the security tag from the article.

7. The method according to claim 1, further comprising detecting when the article to which the security tag is affixed enters a surveillance zone of an Electronic Article Surveillance system.

8. The method according to claim 1, wherein the article comprises optical wear.

\* \* \* \* \*